(12) United States Patent
Nakamoto et al.

(10) Patent No.: US 10,174,195 B2
(45) Date of Patent: *Jan. 8, 2019

(54) REINFORCED THERMOPLASTIC RESIN COMPOSITION AND MOLDED ARTICLE

(71) Applicant: UMG ABS, LTD., Tokyo (JP)

(72) Inventors: Masahito Nakamoto, Ube (JP); Hideichiro Kawaguchi, Ube (JP)

(73) Assignee: UMG ABS, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/559,657

(22) PCT Filed: Mar. 14, 2016

(86) PCT No.: PCT/JP2016/057941
§ 371 (c)(1),
(2) Date: Sep. 19, 2017

(87) PCT Pub. No.: WO2016/158342
PCT Pub. Date: Oct. 6, 2016

(65) Prior Publication Data
US 2018/0230304 A1 Aug. 16, 2018

(30) Foreign Application Priority Data
Mar. 27, 2015 (JP) .................. 2015-065828

(51) Int. Cl.
| | |
|---|---|
| C08L 77/00 | (2006.01) |
| C08L 69/00 | (2006.01) |
| C08K 5/521 | (2006.01) |
| C08K 7/06 | (2006.01) |
| C08K 7/14 | (2006.01) |
| C08L 55/02 | (2006.01) |
| C08L 63/00 | (2006.01) |
| C08J 5/04 | (2006.01) |
| C08L 25/06 | (2006.01) |
| C08L 25/12 | (2006.01) |
| C08L 77/10 | (2006.01) |

(52) U.S. Cl.
CPC .............. *C08L 69/00* (2013.01); *C08J 5/042* (2013.01); *C08J 5/043* (2013.01); *C08K 5/521* (2013.01); *C08K 7/06* (2013.01); *C08K 7/14* (2013.01); *C08L 25/06* (2013.01); *C08L 25/12* (2013.01); *C08L 55/02* (2013.01); *C08L 63/00* (2013.01); *C08L 77/00* (2013.01); *C08L 77/10* (2013.01); *C08L 2205/035* (2013.01)

(58) Field of Classification Search
None
See application file for complete search history.

(56) References Cited

U.S. PATENT DOCUMENTS

| | | | |
|---|---|---|---|
| 5,538,784 A | 7/1996 | Subramanian | |
| 9,732,221 B2* | 8/2017 | Nakamoto | ............... C08K 3/04 |
| 2008/0119631 A1 | 5/2008 | Mullen | |
| 2010/0273922 A1 | 10/2010 | Fujimoto et al. | |
| 2010/0276289 A1 | 11/2010 | Tezuka et al. | |
| 2012/0178860 A1 | 7/2012 | Nakamoto et al. | |
| 2015/0322261 A1 | 11/2015 | Nakamoto et al. | |

FOREIGN PATENT DOCUMENTS

| | | |
|---|---|---|
| CN | 101759981 A | 6/2010 |
| CN | 102007183 A | 4/2011 |
| CN | 102395626 A | 3/2012 |
| JP | 60-088062 A | 5/1985 |
| JP | 01170635 A | 7/1989 |
| JP | 02-502294 A | 7/1990 |
| JP | 03017151 A | 1/1991 |
| JP | 06-049344 A | 2/1994 |
| JP | 06-107944 A | 4/1994 |
| JP | 2001-240738 A | 9/2001 |
| JP | 2002020606 A | 1/2002 |
| JP | 2007039489 A | 2/2007 |
| JP | 2009-155576 A | 7/2009 |
| JP | 2009-155577 A | 7/2009 |
| JP | 2011-207978 A | 10/2011 |
| JP | 2011-225630 A | 11/2011 |
| JP | 2011-231283 A | 11/2011 |
| JP | 2012-533645 A | 12/2012 |
| JP | 2013-014747 A | 1/2013 |
| JP | 2014-101474 A | 6/2014 |
| JP | 2014-145029 A | 8/2014 |
| JP | 2015-205992 A | 11/2015 |
| TW | 200936679 A | 9/2009 |
| TW | 200936680 A | 9/2009 |
| TW | 201127903 A1 | 8/2011 |
| WO | 90/02156 A1 | 3/1990 |
| WO | 2011/008370 A1 | 1/2011 |
| WO | 2011/037172 A1 | 3/2011 |

OTHER PUBLICATIONS

Notice of Allowance dated Oct. 3, 2017 for Japanese Patent Application No. 2017-509503.

(Continued)

*Primary Examiner* — Ana L. Woodward
(74) *Attorney, Agent, or Firm* — Plumsea Law Group, LLC

(57) ABSTRACT

A reinforced thermoplastic resin composition is provided containing a resin main component (C) including 50% to 100% by mass of a polycarbonate resin (A) and 0% to 50% by mass of a graft copolymer (B) obtained by polymerizing a monomer mixture containing an aromatic alkenyl compound monomer (a) and a vinyl cyanide compound monomer (b) in the presence of a rubbery polymer (B1), an inorganic filler (D), a glycidyl ether unit-containing polymer (E) having a glycidyl ether unit and a mass-average molecular mass of 3,800 to 60,000, and polyamide 6/66 (F) having a moisture content of 0.1% or less in a specific ratio.

7 Claims, No Drawings

(56) References Cited

OTHER PUBLICATIONS

International Search Report and Written Opinion dated May 10, 2016 for PCT Application No. PCT/JP2016/057941.
Office Action dated Dec. 13, 2016 for Taiwan Patent Application No. 105108472.
Office Action dated Jul. 4, 2017 for Japanese Patent Application No. 2017-509503.
Notice of Allowance dated Oct. 31, 2016 in Korean Patent Application No. 10-2016-7027317, and English Translation thereof.
Office Action dated Mar. 3, 2017 in Chinese Patent Application No. 201580020417.7, and Partial English Translation thereof.
International Search Report dated Apr. 14, 2015 in PCT Patent Application No. PCT/JP2015/058042, and English translation thereof.
Dow Plastics, "D.E.R, 667", Dec. 2000.
Hexion, "EPON TM Resin 1007F", Sep. 2007.
Hexion, "EPON TM Resin 1009F", Sep. 2007.
Office Action dated Dec. 23, 2016 in U.S. Appl. No. 15/304,075.

* cited by examiner

REINFORCED THERMOPLASTIC RESIN COMPOSITION AND MOLDED ARTICLE

TECHNICAL FIELD

The present invention relates to a thermoplastic resin composition reinforced with an inorganic filler, and a molded article using the same.

Priority is claimed on Japanese Patent Application No. 2015-065828, filed on Mar. 27, 2015, the content of which is incorporated herein by reference.

BACKGROUND

As a housing material for mobile devices (for example, notebook type or tablet type personal computers, mobile phones including smart phones, digital cameras, digital video cameras, and the like), a thermoplastic resin composition (for example, ABS resin, polycarbonate resin/ABS resin, polyamide resin, and the like), or a material obtained by reinforcing a thermoplastic resin composition with an inorganic filler has been widely used. As a method of manufacturing a mobile device housing, a method of molding a thermoplastic resin composition by injection molding is usually adopted.

In recent years, for the housing of mobile devices, it has been required to further reduce a thickness, to provide sufficient resistance to impact and load in a state of being placed in a bag or the like, to be unpainted for the purpose of cost reduction, and the like. In order to satisfy these requirements, a thermoplastic resin composition used for the housing is required to have not only high rigidity and mechanical strength (impact resistance, and the like) after processing into a molded article, but also high weld strength, heat resistance, and good moldability at the time of molding.

However, for example, since the rigidity of thermoplastic resin compositions such as an ABS resin, a polycarbonate resin/ABS resin, and a polyamide resin which are not reinforced by an inorganic filler is low after processing into a molded article, such thermoplastic resin compositions cannot cope with the requirement of reducing the thickness of the housing. In addition, polyamide resin has high hygroscopicity, and warpage, dimensional change, and appearance deterioration are likely to occur over time after molding.

Therefore, as a thermoplastic resin composition used for the housing, a reinforced thermoplastic resin composition having improved rigidity by adding an inorganic filler such as glass fiber or carbon fiber to an ABS resin or polycarbonate resin/ABS resin has been studied.

However, a reinforced thermoplastic resin composition containing an ABS resin or polycarbonate resin/ABS resin as a main component has high rigidity when formed into a molded article, and although the housing can be reduced in thickness, weld strength and impact resistance, when formed into the molded article, are insufficient. On the other hand, a reinforced thermoplastic resin composition containing a polyamide resin as the main component is excellent in weld strength after processing into a molded article, but cannot solve the above-described warpage problem. This is a problem caused by moisture absorption of the molded article after molding, and a solution to the above problem by devising a molding material has not yet been proposed.

As a reinforced thermoplastic resin composition capable of obtaining a molded article excellent in impact resistance, the following have been proposed.

(1) A reinforced thermoplastic resin composition containing an aromatic polycarbonate resin, a graft copolymer, a glass fiber surface-treated with a water-soluble polyurethane, a glycidyl ether unit-containing polymer, and a phosphate ester-based flame retardant (PTL 1).

(2) A reinforced thermoplastic resin composition containing an aromatic polycarbonate resin, a fibrous filler surface-treated with polyamide, and a lubricant having a carboxyl group (PTL 2).

As a reinforced thermoplastic resin composition capable of obtaining a molded article excellent in mechanical strength, the following have been proposed.

(3) A reinforced thermoplastic resin composition containing an aromatic polycarbonate resin, a thermoplastic polyester resin, a glass fiber surface-treated with a silane coupling agent and an epoxy resin, and a thermoplastic elastomeric polymer (PTL 3).

(4) A reinforced thermoplastic resin composition containing a polycarbonate resin, a rubber-containing polymer, and carbon fibers converged with a nylon-based sizing agent (PTL 4).

CITATION LIST

PTL 1: Japanese Unexamined Patent Application, First Publication No. 2013-14747
PTL 2: Japanese Unexamined Patent Application, First Publication No. 2001-240738
PTL 3: Japanese Unexamined Patent Application, First Publication No. H 6-49344
PTL 4: Japanese Unexamined Patent Application, First Publication No. S 60-88062

SUMMARY

Technical Problem

However, a reinforced thermoplastic resin composition of (1) has insufficient weld strength after processing into a molded article.

A reinforced thermoplastic resin composition of (2) has a problem in that mechanical strength other than impact resistance after processing into a molded article is low.

Reinforced thermoplastic resin compositions of (3) and (4) have insufficient impact resistance after processing into molded articles.

In addition to the reinforced thermoplastic resin compositions of (1) to (4), many reinforced thermoplastic resin compositions to which an epoxy compound is added have been proposed for the purpose of improving the mechanical strength of the molded article.

However, a reinforced thermoplastic resin composition excellent in moldability and well-balanced weld strength, mechanical strength, and impact resistance of the obtained molded article has not yet been proposed.

The present invention provides a reinforced thermoplastic resin composition having good moldability and capable of increasing the weld strength, rigidity, impact resistance, mechanical strength, and heat resistance of the obtained molded article, and a molded article with high weld strength, rigidity, impact resistance, mechanical strength, and heat resistance.

Solution to Problem

The present invention includes the following aspects.
1. A reinforced thermoplastic resin composition containing a resin main component (C) including 50% to 100% by mass of a polycarbonate resin (A) and 0% to 50% by mass of a graft copolymer (B) obtained by polymerizing a monomer mixture containing an aromatic alkenyl compound monomer (a) and a vinyl cyanide compound monomer (b) in the presence of a rubbery polymer (B1) (here, total of the polycarbonate resin (A) and the graft copolymer (B) is 100% by mass), an inorganic filler (D), a glycidyl ether unit-containing polymer (E) having a glycidyl ether unit and a mass-average molecular mass of 3,800 to 60,000 (here, the graft copolymer (B) is excluded), and polyamide 6/66 (F) having a moisture content of 0.1% or less, in which a proportion of the inorganic filler (D) is 20% to 50% by mass with respect to the total mass (100% by mass) of the reinforced thermoplastic resin composition, a content of the glycidyl ether unit-containing polymer (E) is 1 to 10 parts by mass with respect to 100 parts by mass of the resin main component (C), and a content of the polyamide 6/66 (F) is 1 to 15 parts by mass with respect to 100 parts by mass of the resin main component (C).

2. The reinforced thermoplastic resin composition according to 1, in which the polyamide 6/66 (F) has a relative viscosity of 1.5 to 4.5.

3. The reinforced thermoplastic resin composition according to 1, in which the inorganic filler (D) is a carbon fiber.

4. The reinforced thermoplastic resin composition according to 1, in which the inorganic filler (D) is a glass fiber.

5. The reinforced thermoplastic resin composition according to any one of 1, further including a phosphate ester-based flame retardant (G).

6. The reinforced thermoplastic resin composition according to 5, in which a mass-average molecular mass of the phosphate ester-based flame retardant (G) exceeds 326.

7. A molded article that is obtained by molding the reinforced thermoplastic resin composition according to any one of 1

Advantageous Effects of Invention

The reinforced thermoplastic resin composition of the present invention has good moldability and can enhance the weld strength, the rigidity, the impact resistance, the mechanical strength, and the heat resistance of the molded article obtained by molding the resin composition.

The molded article of the present invention has high weld strength, rigidity, impact resistance, mechanical strength, and heat resistance.

DETAILED DESCRIPTION

Hereinafter, the present invention will be described in detail.

In the following description, "(meth) acrylate" is a general term for acrylate and methacrylate. In addition, a "molded article" is formed by molding a reinforced thermoplastic resin composition of the present invention.

Reinforced Thermoplastic Resin Composition

The reinforced thermoplastic resin composition of the present invention contains a resin main component (C) which includes the following polycarbonate resin (A) essentially and, as necessary, a graft copolymer (B); an inorganic filler (D); a glycidyl ether unit-containing polymer (E); and a polyamide 6/66 (F), as essential components. In addition, it is preferable that the reinforced thermoplastic resin composition further contain a phosphate ester-based flame retardant (G) and a flame retardant aid (H).

Polycarbonate Resin (A)

The polycarbonate resin (A) is a resin obtained from a dihydroxy diaryl alkane. The polycarbonate resin (A) may have a branched structure.

As the polycarbonate resin (A), one type may be used alone, or two or more types may be used in combination.

Method of Manufacturing Polycarbonate Resin (A)

The polycarbonate resin (A) is manufactured by a known method. The polycarbonate resin (A) is manufactured, for example, by a method of reacting a dihydroxy or polyhydroxy compound with phosgene or a diester of carbonic acid, a melt polymerization method, or the like. Examples of the dihydroxy diaryl alkane include those having an alkyl group at a position ortho to the hydroxy group. Preferred specific examples of the dihydroxy diaryl alkane include 4,4-dihydroxy 2,2-diphenylpropane (that is, bisphenol A), tetramethyl bisphenol A, or bis-(4-hydroxyphenyl)-p-diisopropyl benzene, and the like.

The branched polycarbonate resin (A) is manufactured, for example, by substituting a portion (for example, 0.2 to 2 mol %) of the dihydroxy compound with a polyhydroxy compound. Specific examples of the polyhydroxy compound include phloroglucinol, 4,6-dimethyl-2,4,6-tri-(4-hydroxyphenyl)-heptene, 4,6-dimethyl-2,4,6-(4-hydroxyphenyl)-heptane, 1,3,5-tri-(4-hydroxyphenyl)-benzene, and the like.

As the polycarbonate resin (A), one recycled from a compact disc, or the like may be used.

Viscosity-average molecular mass of Polycarbonate Resin (A)

The viscosity-average molecular mass (Mv) of the polycarbonate resin (A) is preferably from 15,000 to 35,000. When the viscosity-average molecular mass of the polycarbonate resin (A) is 15,000 or more, the impact resistance of the molded article is further enhanced. When the viscosity-average molecular mass of the polycarbonate resin (A) is 35,000 or less, moldability of the reinforced thermoplastic resin composition is further enhanced. The viscosity-average molecular mass of the polycarbonate resin (A) is more preferably 17,000 to 25,000 from the viewpoint of a particularly excellent balance between mechanical strength and impact resistance of the molded article, and fluidity of the reinforced thermoplastic resin composition.

The viscosity-average molecular mass of the polycarbonate resin (A) can be determined by, for example, a known method of measuring a solution viscosity in the related art. In a case where a commercially available polycarbonate resin (A) is used, the viscosity-average molecular mass of the catalog value may be used.

Proportion of Polycarbonate Resin (A)

The proportion of the polycarbonate resin (A) is 50% to 100% by mass, and preferably 80% to 95% by mass, based on the resin main component (C) (100% by mass). When the proportion of the polycarbonate resin (A) is 50% by mass or more, the impact resistance of the molded article is enhanced. When the proportion of the polycarbonate resin (A) is 95% by mass or less, the moldability of the reinforced thermoplastic resin composition is further improved.

Graft Copolymer (B)

The graft copolymer (B) is obtained by polymerizing a monomer mixture containing an aromatic alkenyl compound monomer (a) and a vinyl cyanide compound monomer (b) in the presence of a rubbery polymer (B1), and is obtained by grafting a molecular chain (B2) having an aromatic alkenyl compound monomer (a) unit and vinyl cyanide compound monomer (b) unit to a rubbery polymer (B1). More specifically, the graft copolymer (B) is one in which the molecular chain (B2) having an aromatic alkenyl compound monomer (a) unit and vinyl cyanide compound monomer (b) unit is bonded to the particles of the rubbery polymer (B1) having a volume-average particle diameter of 0.1 to 0.6 μm, and is composed of a core part consisting of the rubbery polymer (B1), and an outer layer portion consisting of the aromatic alkenyl compound monomer (a) unit and the vinyl cyanide compound monomer (b) unit.

As the graft copolymer (B), one type may be used alone, or two or more types may be used in combination.

Rubbery Polymer (B1)

Examples of the rubbery polymer (B1) include butadiene rubber, styrene-butadiene rubber, acrylonitrile-butadiene rubber, isoprene rubber, chloroprene rubber, butyl rubber, ethylene-propylene rubber, acrylic rubber, ethylene-propylene-nonconjugated diene rubber, epichlorohydrin Rubber, diene-acrylic composite rubber, silicone (polysiloxane)-acrylic composite rubber, and the like. Among these, from the viewpoint of good plating performance of the molded article, butadiene rubber, styrene-butadiene rubber, acrylonitrile-butadiene rubber, acrylic rubber, diene-acrylic composite rubber, and silicone-acrylic composite rubber are preferable, and from the viewpoint of good flame retardancy of the molded article, a silicone-acrylic composite rubber is more preferable.

Diene-Acrylic Composite Rubber

The diene component of the diene-acrylic composite rubber contains 50% by mass or more of a butadiene unit. Examples of the diene component include butadiene rubber, styrene-butadiene rubber, acrylonitrile-butadiene rubber, and the like.

The acrylic rubber component of the diene-acrylic composite rubber is obtained by polymerizing an alkyl (meth) acrylate (f) and a polyfunctional monomer (g).

Examples of the alkyl (meth) acrylate (f) include alkyl acrylate (methyl acrylate, ethyl acrylate, n-propyl acrylate, n-butyl acrylate, 2-ethyl hexyl acrylate, and the like), alkyl methacrylate (hexyl methacrylate, 2-ethylhexyl methacrylate, n-lauryl methacrylate, and the like), and the like. As the alkyl (meth) acrylate (f), one type may be used alone, or two or more types may be used in combination.

Examples of the polyfunctional monomer (g) include allyl methacrylate, ethylene glycol dimethacrylate, propylene glycol dimethacrylate, 1,3-butylene glycol dimethacrylate, 1,4-butylene glycol dimethacrylate, triallyl cyanurate, triallyl isocyanurate, and the like. As the polyfunctional monomer (g), one type may be used alone, or two or more types may be used in combination.

Examples of the composite structure of the diene-acrylic composite rubber include a core-shell structure in which a periphery of the diene component is covered with an acrylic rubber component; a core-shell structure in which a periphery of the acrylic rubber component is covered with a diene component; a structure in which the diene component and the acrylic rubber component are mutually intertwined; a copolymerization structure in which a diene-based monomer unit and an alkyl (meth) acrylate-based monomer unit are randomly arranged, and the like.

Silicone-Acrylic Composite Rubber

The silicone component of the silicone-acrylic composite rubber is based on polyorganosiloxane as a main component. As the silicone component, a polyorganosiloxane containing a vinyl polymerizable functional group is preferable.

The acrylic rubber component of the silicone-acrylic composite rubber is the same as the acrylic rubber component of the diene-acrylic composite rubber.

Examples of the composite structure of the silicone-acrylic composite rubber include a core-shell structure in which a periphery of the silicone component is covered with an acrylic rubber component; a core-shell structure in which a periphery of an acrylic rubber component is covered with a silicone component; a structure in which a silicone component and an acrylic rubber component are intertwined; a structure in which a segment of the polyorganosiloxane and a segment of the polyalkyl (meth) acrylate are linearly and sterically bonded to each other to form a net-like rubber structure; and the like.

Method of Manufacturing Rubbery Polymer (B1)

The rubbery polymer (B1) is prepared, for example, by emulsion polymerization of a monomer capable of forming the rubbery polymer (B1) in the presence of a radical polymerization initiator. According to the preparation method by the emulsion polymerization method, the particle diameter of the rubber polymer (B1) can be easily controlled.

The volume-average particle diameter of the rubbery polymer (B1) is preferably 0.1 to 0.6 μm from the viewpoint of further enhancing the impact resistance of the molded article.

In the present invention, the volume-average particle diameter is a value measured by a method such as a laser diffraction/scattering method, for example.

Content of Rubbery Polymer (B1)

The content of the rubbery polymer (B1) is preferably 0.5% to 3.5% by mass of the resin main component (C) (100% by mass). When the content of the rubbery polymer (B1) is 0.5% by mass or more, the impact resistance of the molded article can be further enhanced. When the content of the rubbery polymer (B1) is 3.5% by mass or less, the moldability of the reinforced thermoplastic resin composition is further improved and the appearance of the molded article is improved.

Molecular Chain (B2)

The molecular chain (B2) has an aromatic alkenyl compound monomer (a) unit and a vinyl cyanide compound monomer (b) unit as an essential component, and has another monomer (c) unit copolymerizable therewith as an optional component. From the viewpoint of excellent balance between the impact resistance of the molded article and the moldability of the reinforced thermoplastic resin composition, the proportion of each monomer unit is preferably such that the proportion of the aromatic alkenyl compound monomer (a) unit is 50% to 90% by mass, the proportion of the vinyl cyanide compound monomer (b) unit is 10% to 50% by mass, and the proportion of the other monomer (c) unit is 0% to 40% by mass (here, the total of the monomers (a) to (c) is 100% by mass).

Examples of the aromatic alkenyl compound monomer (a) include styrene, α-methylstyrene, vinyl toluene, and the like, and among these, styrene is preferable.

Examples of the vinyl cyanide compound monomer (b) include acrylonitrile, methacrylonitrile, and the like, and among these, acrylonitrile is preferable.

Examples of the other monomer (c) include alkyl methacrylate (methyl methacrylate, ethyl methacrylate, 2-ethylhexyl methacrylate, and the like), alkyl acrylate (methyl acrylate, ethyl acrylate, butyl acrylate, and the like), maleimide compound (N-phenyl maleimide, and the like), and the like.

Acetone-insoluble Component and Acetone-soluble Component of Graft Copolymer (B)

It is preferable that the graft copolymer (B) contain 70% to 99% by mass of acetone-insoluble component and have a reduced viscosity of 0.3 to 0.7 dl/g as measured at 25° C. using an N, N-dimethylformamide solution of 0.2 g/dl of the acetone-soluble component.

When the acetone-insoluble component is 70% by mass or more, the surface appearance of the molded article is improved, and the moldability of the reinforced thermoplastic resin composition is further improved. When the insoluble component in the acetone solvent is 99% by mass or less, the tearing strength of the molded article is improved.

When the reduced viscosity of the acetone-soluble component is 0.3 dl/g or more, the tearing strength of the molded article is improved. When the reduced viscosity of the acetone-soluble component is 0.7 dl/g or less, the surface appearance of the molded article is improved, and the moldability of the reinforced thermoplastic resin composition is further improved.

The reduced viscosity in the present invention can be determined, for example, by a method of measuring the solution viscosity similar to the viscosity-average molecular mass.

The method of measuring the acetone-soluble component is as follows.

2.5 g of the graft copolymer is immersed in 90 ml of acetone, and heated at 65° C. for 3 hours, and thereafter centrifuged at 1500 rpm for 30 minutes using a centrifugal separator. Thereafter, the supernatant is removed, the residue is dried in a vacuum dryer at 65° C. for 12 hours, and the dried sample is precisely weighed. From the mass difference (2.5 g−the mass of the sample after drying), the proportion (%) of the acetone-soluble component in the graft copolymer can be determined. The reduced viscosity of the acetone-soluble component is measured at 25° C. using an N, N-dimethylformamide solution of 0.2 g/dl.

The acetone-soluble component is a polymer similar to the molecular chain (B2) and is a polymer not grafted to the rubbery polymer (B1). The acetone-soluble component is simultaneously produced when the molecular chain (B2) is grafted to the rubbery polymer (B1) in many cases. Therefore, the graft copolymer (B) contains the acetone-soluble component and the acetone-insoluble component.

Method of Manufacturing Graft Copolymer (B)

The graft copolymer (B) is obtained by graft polymerization of the aromatic alkenyl compound monomer (a), the vinyl cyanide compound monomer (b), and, as necessary, the other monomer (c) in the presence of the rubbery polymer (B1).

As a graft polymerization method, an emulsion polymerization method is preferable. In addition, in the graft polymerization, various chain transfer agents may be added in order to adjust the molecular weight of the graft copolymer (B), the graft ratio, and the reduced viscosity of the acetone-soluble component.

Proportion of Graft Copolymer (B)

The proportion of the graft copolymer (B) is 0% to 50% by mass, and preferably 5% to 20% by mass of the resin main component (C) (100% by mass). When the proportion of the graft copolymer (B) is 5% by mass or more, the moldability of the reinforced thermoplastic resin composition is further improved. When the proportion of the graft copolymer (B) is 50% by mass or less, the impact resistance of the molded article is enhanced. In a case where the proportion of the graft copolymer (B) to the total mass (100% by mass) of the resin main component (C) is 0%, the proportion of the polycarbonate resin (A) is 100% by mass.

Inorganic Filler (D)

Examples of the inorganic filler (D) include inorganic fiber such as glass fiber and carbon fiber, inorganic fiber coated with metal, inorganic substance such as wollastonite, talc, mica, glass flake, glass bead, potassium titanate, calcium carbonate, magnesium carbonate, carbon black, and ketjen black, metal or alloy such as iron, copper, zinc, and aluminum, fibers and powders of oxides thereof, and the like. Among these, glass fiber or carbon fiber is preferably used since high rigidity can be obtained with less blending.

As the inorganic filler (D), one type may be used alone, or two or more types may be used in combination.

The surface of the above inorganic fiber, the inorganic fiber coated with metal, an inorganic substance, metal and alloy, and fibers and powders of these oxides may be treated with a known coupling agent (for example, a silane-based coupling agent or a titanate-based coupling agent) or other surface treatment agent.

In addition, the glass fiber and the carbon fiber may be coated or bundled with thermoplastic resins such as ethylene/vinyl acetate copolymer and polyamide, a polyurethane resin, or a thermosetting resin such as an epoxy resin.

The ratio (major axis/minor axis) of the major axis to the minor axis in the fiber cross-section of the glass fiber and the carbon fiber is preferably 1 to 6, and more preferably 2 to 4, respectively. When the major axis/minor axis is 1 or more, good impact properties and strength can be obtained. When the major axis/minor axis is 6 or less, good shaping workability (extrusion workability) can be obtained.

The major axis/minor axis in the fiber cross section is obtained by, for example, observing the fiber cross section at 8 points using an electron microscope, and averaging the major axis/minor axis at the 8 points. In a case where a commercially available product is used, the major axis/minor axis in the fiber cross section of the catalog value may be used.

In addition, the glass fiber or the carbon fiber may be either long fibers or short fibers. As the glass fiber and the carbon fiber, short fibers having little anisotropy are preferable, and chopped fibers are more preferable.

As the inorganic filler (D), one type may be used alone, or two or more types may be used in combination.

Proportion of Inorganic Filler (D)

The proportion of the inorganic filler (D) is 20% to 50% by mass, and preferably 30% to 45% by mass with respect to the total mass (100% by mass) of the reinforced thermoplastic resin composition. When the proportion of the inorganic filler (D) is 20% by mass or more, the rigidity and the like of the molded article are enhanced. When the proportion of the inorganic filler (D) is 50% by mass or less, the moldability of the reinforced thermoplastic resin composition is enhanced.

Glycidyl Ether Unit-Containing Polymer (E)

The glycidyl ether unit-containing polymer (E) is a polymer having a glycidyl ether unit in the molecule. The glycidyl ether unit-containing polymer (E) does not include those having a halogen atom (such as bromine) or a block type polymer.

Examples of the glycidyl ether unit-containing polymer (E) include a glycidyl ether type epoxy resin obtained by reacting a compound having a hydroxy group with epichlorohydrin.

Examples of the glycidyl ether type epoxy resin include a bisphenol type epoxy resin; a novolak type epoxy resin; polyglycidyl ether of aliphatic polyhydric alcohol; a biphenyl type epoxy resin and the like having a molecular chain having a repeating unit represented by the following formula (1) (for example, an epoxy group-containing phenoxy resin), and the like.

Chemical Formula 1

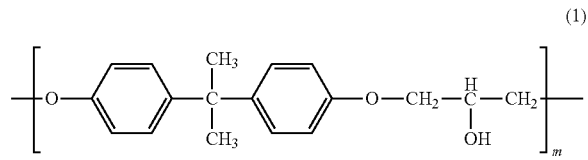

(1)

Here, m is an integer of 1 or more.

Examples of the bisphenol type epoxy resin include a bisphenol A type epoxy resin, a bisphenol F type epoxy resin, a bisphenol AD type epoxy resin, an epoxy resin having a structure of bisphenol A and bisphenol F, and the like.

Examples of the novolak type epoxy resin include a phenol novolak type epoxy resin, a cresol novolak type epoxy resin, and the like.

Examples of polyglycidyl ether of aliphatic polyhydric alcohol include alkylene glycol diglycidyl ether (for example, ethylene glycol diglycidyl ether, and the like), polyoxyalkylene glycol diglycidyl ether (for example, diethylene glycol diglycidyl ether, polyethylene glycol diglycidyl ether, dipropylene glycol diglycidyl ether, tripropylene glycol diglycidyl ether, polypropylene glycol diglycidyl ether, and the like), glycerin triglycidyl ether, and the like.

The glycidyl ether unit-containing polymer (E) is preferably a bisphenol A type epoxy resin, a bisphenol F type epoxy resin, an epoxy resin having a structure of bisphenol A and bisphenol F, a phenol novolak type epoxy resin, a cresol novolak type epoxy resin, an epoxy group-containing phenoxy resin, or the like, from the viewpoint of further enhancing the mechanical strength of the molded article.

The glycidyl ether unit-containing polymer (E) may be in a liquid state, may be in a semisolid state, or may be in a solid state at room temperature (20° C.). The glycidyl ether unit-containing polymer (E) is preferably solid in consideration of workability in mixing and kneading.

As the glycidyl ether type epoxy resin, one type may be used alone, or two or more types may be used in combination.

Mass-Average Molecular Weight of Glycidyl Ether Unit-Containing Polymer (E)

The mass-average molecular mass of the glycidyl ether unit-containing polymer (E) is 3,800 to 60,000, and preferably 5,500 to 50,000. When the mass-average molecular mass of the glycidyl ether unit-containing polymer (E) is 3,800 or more, the impact resistance and the mechanical strength of the molded article are enhanced. When the mass-average molecular mass of the glycidyl ether unit-containing polymer (E) is 60,000 or less, the moldability of the reinforced thermoplastic resin composition is improved.

The mass-average molecular mass of the glycidyl ether unit-containing polymer (E) can be determined by a known mass spectrometry method in the related art. When a commercially available glycidyl ether unit-containing polymer (E) is used, the mass-average molecular mass of the catalog value may be used.

Method of Obtaining Glycidyl Ether Unit-Containing Polymer (E)

Examples of commercially available products of the glycidyl ether unit-containing polymer (E) include jER (registered trademark) series manufactured by Mitsubishi Chemical Corporation, Epotote (registered trademark) series and Phenototo series (registered trademark) manufactured by Nippon Steel Sumikin Kagaku Co., Ltd., AER (registered trademark) series manufactured by Asahi Kasei E-Materials Co., Ltd., Epiclon (registered trademark) series manufactured by DIC Corporation, and the like.

Content of Glycidyl Ether Unit-Containing Polymer (E)

The content of the glycidyl ether unit-containing polymer (E) is 1 to 10 parts by mass, and preferably 3 to 8 parts by mass with respect to 100 parts by mass of the resin main component (C). When the content of the glycidyl ether unit-containing polymer (E) is 1 part by mass or more with respect to 100 parts by mass of the resin main component (C), the mechanical strength, the impact resistance, and weld strength of the molded article are enhanced. When the content of the glycidyl ether unit-containing polymer (E) is 10 parts by mass or less with respect to 100 parts by mass of the resin main component (C), the moldability of the reinforced thermoplastic resin composition is improved.

Polyamide 6/66 (F)

Polyamide 6/66 (F) is a copolymer (polyamide 6/66 copolymer) of polycaproamide (polyamide 6) and polyhexamethylene adipamide (polyamide 66).

Polyamide 6/66 (F) is obtained by copolymerizing ε-caprolactam, hexamethylenediamine, and adipic acid.

The polyamide 6/66 (F) preferably has a higher proportion of polycaproamide (polyamide 6), specifically, it is preferable that the caproamide unit be 55% to 95% by mass and the hexamethylene adipamide unit be 5% to 45% by mass with respect to 100% by mass of the total of the caproamide unit and the hexamethylene adipamide unit. When the proportion of caproamide unit is 55% by mass or more, the weld strength of the molded article is further enhanced. When the content is 95% by mass or less, the moldability of the reinforced thermoplastic resin composition is further improved.

The moisture content of polyamide 6/66 (F) is 0.1% or less. In a case where the polyamide 6/66 having a moisture content exceeding 0.1% is used, the weld strength and the heat resistance are lowered. Since the polyamide resin generally has water absorption properties, the moisture content differs depending on a storage method or state, a storage period, variations among production lots, or the like. Therefore, in the present invention, the moisture content of the polyamide 6/66 is measured before use, and the moisture content thereof is confirmed before use.

Relative Viscosity of Polyamide 6/66 (F)

The relative viscosity of polyamide 6/66 (F) is preferably 1.5 to 4.5, more preferably 2.0 to 4.0, and further preferably 2.5 to 3.5. When the relative viscosity of the polyamide 6/66 (F) is 1.5 or more, the weld strength of the molded article is further enhanced. When the relative viscosity of polyamide 6/66 (F) is 4.5 or less, the moldability is further improved.

The relative viscosity of polyamide 6/66 (F) can be determined, for example, using a sulfuric acid solution (concentration: 1.0 g/dl) of 96% by mass at 25° C. using an Ostwald type viscometer. In a case where commercially available polyamide 6/66 (F) is used, the relative viscosity of the catalog value may be used.

Content of Polyamide 6/66 (F)

The content of the polyamide 6/66 (F) is 1 to 15 parts by mass, and preferably 3 to 10 parts by mass with respect to 100 parts by mass of the resin main component (C). When the content of the polyamide 6/66 (F) is 1 part by mass or more with respect to 100 parts by mass of the resin main component (C), the weld strength of the molded article is enhanced. When the content of the polyamide 6/66 (F) is 15 parts by mass or less with respect to 100 parts by mass of the resin main component (C), the weld strength of the molded article can be prevented from lowering or warping.

Flame Retardant

A flame retardant may be blended to the reinforced thermoplastic resin composition of the present invention. Examples of the flame retardant include a phosphate ester-based flame retardant (G), a known non-halogen-based flame retardant, and the like.

Phosphate Ester-based Flame Retardant (G)

As the phosphate ester-based flame retardant (G), a compound represented by the following formula (2) can be mentioned.

Chemical Formula 2

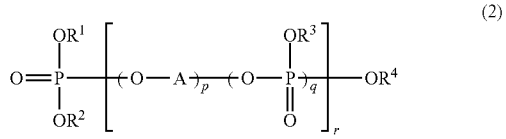

(2)

Here, $R^1$, $R^2$, $R^3$, and $R^4$ are each independently a hydrogen atom or an organic group, and all of the $R^1$, $R^2$, $R^3$, and $R^4$ are not hydrogen atoms simultaneously, A is a divalent or higher organic group, P is 0 or 1, q is an integer of 1 or more, and r is an integer of 0 or more.

Examples of the organic group include an alkyl group which may be substituted (for example, methyl group, ethyl group, butyl group, octyl group, and the like), a cycloalkyl group (for example, a cyclohexyl group, and the like), and an aryl group (for example, a phenyl group or an alkyl group-substituted phenyl group, and the like). There is no limit to the number of substituents when substituted. Examples of the substituted organic group include an alkoxy group, an alkylthio group, an aryloxy group, an arylthio group, and the like. It may be a combination of these substituents (for example, an arylalkoxyalkyl group, or the like), or may be a combination of these substituents bonded with an oxygen atom, a nitrogen atom, a sulfur atom, or the like (for example, an arylsulfonylaryl group, or the like).

The divalent or higher organic group is a divalent or higher functional group obtained by removing two or more hydrogen atoms bonded to a carbon atom from the organic group. Examples thereof include an alkylene group, (substituted) phenylene group, and the like. The position of the hydrogen atom removed from the carbon atom is optional.

Specific examples of the phosphate ester-based flame retardant (G) include trimethyl phosphate, triethyl phosphate, tributyl phosphate, trioctyl phosphate, tributoxyethyl phosphate, triphenyl phosphate, tricresyl phosphate, trixyl phosphate, cresyl diphenyl phosphate, xyl diphenyl phosphate, octyl diphenyl phosphate, diphenyl-2-ethyl-cresyl phosphate, tris (isopropylphenyl) phosphate, resorcinol diphenyl phosphate, polyphosphate (bisphenol A bisphosphates, hydroquinone bisphosphate, resorcinol bisphosphate, trioxybenzene phosphate, bisphenol A bis (dicresyl phosphate), bisphenol A bis (diphenyl phosphate), phenylene bis (diphenyl phosphate), phenylene bis (ditolyl phosphate), or phenylene bis (dixylyl phosphate), and the like), and the like.

Among the phosphate ester-based flame retardants (G), triphenyl phosphate, bisphenol A bis (diphenyl phosphate), phenylene bis (diphenyl phosphate), and phenylene bis (dixylyl phosphate) are preferable.

The polyphosphate is obtained by dehydration condensation of various diol compounds such as polynuclear phenols (for example, bisphenol A group, and the like) with orthophosphoric acid. Examples of the diol include hydroquinone, resorcinol, diphenylol methane, diphenylol dimethyl methane, dihydroxy biphenyl, p,p'-dihydroxydiphenyl sulfone, dihydroxynaphthalene, and the like.

Mass-average molecular mass of Phosphate Ester-based Flame Retardant (G)

The mass-average molecular mass of the phosphate ester-based flame retardant (G) is preferably 326 or more, more preferably more than 326, and particularly preferably 550 or more. Specifically, when a phosphate ester-based flame retardant (G) having a mass-average molecular mass of more than 326 is used, the moldability of the reinforced thermoplastic resin composition is improved, and a molded article having excellent appearance can be obtained. The upper limit of the mass-average molecular mass of the phosphate ester-based flame retardant (G) is preferably 692 or less, more preferably 690 or less, and particularly preferably 686 or less, from the viewpoint of flame retardancy of the molded article.

The mass-average molecular mass of the phosphate ester-based flame retardant (G) can be determined by a known mass spectrometry method in the related art. In a case where a commercially available phosphate ester-based flame retardant (G) is used, the mass-average molecular mass of the catalog value may be used.

Method of Obtaining Phosphate Ester-based Flame Retardant (G)

Examples of commercially available products of the phosphate ester-based flame retardant (G) include FP series manufactured by ADEKA Corporation, Cronitex (registered trademark) series manufactured by Ajinomoto Fine Techno Co., Ltd., Rheophos (registered trademark) series manufactured by Kemushura Japan Co., CR series or PX series manufactured by Daihachi Chemical Industry Co., Ltd., and the like.

Content of Phosphate Ester-based Flame Retardant (G)

The content of the phosphate ester-based flame retardant (G) is preferably from 1 to 25 parts by mass, more preferably from 3 to 23 parts by mass with respect to 100 parts by mass of the resin main component (C). When the content of the phosphate ester-based flame retardant (G) is 1 part by mass or more with respect to 100 parts by mass of the resin main component (C), the moldability of the molded article is further improved. When the content of the phosphate ester-based flame retardant (G) is 25 parts by mass or less with respect to 100 parts by mass of the resin main component (C), the impact resistance of the molded article is further enhanced.

Non-Halogen-Based Flame Retardant

Examples of the non-halogen-based flame retardant include inorganic flame retardants such as phosphazene, phosphorus-containing polyester, red phosphorus, and aluminum hydroxide.

As the red phosphorus-based flame retardant, a retardant stabilized by being coated with a thermosetting resin, or a retardant stabilized by being coated with the thermosetting resin and metal hydroxide is used. Since the red phosphorus-based flame retardant alone is ignitable, it may be mixed with at least a portion of the resin main component (C) or the polycarbonate resin (A) in advance to form a master batch.

Flame Retardant Aid (H)

A flame retardant aid (H) may be blended to the reinforced thermoplastic resin composition of the present invention for preventing dripping during combustion. Examples of the flame retardant aid include a compound having a polytetrafluoroethylene or tetrafluoroethylene unit, a silicone-based polymer, and the like.

In a case of blending a compound having a polytetrafluoroethylene or tetrafluoroethylene unit as the flame retardant aid (H), the content of the flame retardant aid (H) is preferably 1 part by mass or less with respect to 100 parts by mass of the resin main component (C), from the viewpoint of the surface appearance of the molded article.

Other Ingredients

As necessary, other modifiers, release agents, stabilizers for light or heat, antistatic agents, dyes, pigments, and the like may be blended to the reinforced thermoplastic resin composition of the present invention.

Method of Manufacturing Reinforced Thermoplastic Resin Composition

The reinforced thermoplastic resin composition of the present invention contains a polycarbonate resin (A), as necessary, a graft copolymer (B) a inorganic filler (D), a glycidyl ether unit-containing polymer (E), the polyamide 6/66 (F), as necessary, the flame retardant, the flame retardant aid (H), and other components. Specifically, the reinforced thermoplastic resin composition can be obtained by mixing each of the above components using a mixing device (for example, a Henschel mixer, a tumbler mixer, a Nauta mixer, or the like). Furthermore, kneading may be performed using a kneading apparatus (for example, a single screw extruder, a twin screw extruder, a Banbury mixer, a co-kneader, or the like).

Function and Effect

Since the reinforced thermoplastic resin composition of the present invention described above contains the polycarbonate resin (A), as necessary, the graft copolymer (B), the inorganic filler (D), the glycidyl ether unit-containing polymer (E), and the polyamide 6/66 (F) at a specific ratio, the moldability is improved and the weld strength, the rigidity, the impact resistance, the mechanical strength, or the heat resistance of the resulting molded article can be enhanced.

When the reinforced thermoplastic resin composition of the present invention is molded with an injection molding machine under molding conditions of a molding temperature of 290° C., an injection speed of 99%, and a mold temperature of 85° C. to obtain a molded article having a length of 210 mm, a width of 297 mm, and a thickness of 1 mm, using pellets obtained by melt-kneading using a twin-screw extruder and dried at 100° C. for 3 hours, the weld strength obtained by measuring a test force (N) when a crack is generated by pushing the weld in the molded article with a single point terminal is preferably 189 (N) or more, and more preferably 202 to 260 (N). When the weld strength is the above lower limit value or more, it is possible to suppress occurrence of breakage from the weld when a load or impact is applied after processing to the molded article. If the weld strength is the above upper limit value or less, the balance with other properties is improved.

In addition, in the reinforced thermoplastic resin composition of the present invention, for the molded article obtained under the above conditions, a charpy impact strength measured in accordance with ISO 179 is preferably 8 (kJ/m$^2$) or more, and more preferably 10 to 21 (kJ/m$^2$). When the Charpy impact strength is the above lower limit value or more, the impact resistance is sufficiently excellent, and when the Charpy impact strength is the upper limit value or less, the balance with other properties is improved.

In addition, in the reinforced thermoplastic resin composition of the present invention, for the molded article obtained under the above conditions, a flexural strength measured in accordance with ISO 178 is preferably 108 (MPa) or more, and more preferably 133 to 265 (MPa). In addition, a flexural modulus measured in accordance with ISO 178 in the same manner as above is preferably 4100 (MPa) or more, and more preferably 5100 to 14600 (MPa). When the flexural strength is the above lower limit value or more, the mechanical strength is excellent, and when the flexural strength is the upper limit value or less, the balance with other properties is improved. In addition, when the flexural modulus is the above lower limit value or more, the rigidity is excellent, and when the flexural modulus is the upper limit value or less, the balance with other properties is improved.

In addition, in the reinforced thermoplastic resin composition of the present invention, for the molded article obtained under the above conditions, a deflection temperature serving as an index of the heat resistance, measured by the flat-wise method with a load of 1.80 MPa in accordance with ISO 75 is preferably 91 (° C.) or more, and more preferably 94 to 130 (° C.). When the deflection temperature is the above lower limit value or more, the heat resistance is sufficiently excellent, and when the deflection temperature is the upper limit value or less, the balance with other properties is improved.

In addition, in the reinforced thermoplastic resin composition of the present invention, for the molded article obtained under the above conditions, the amount of warpage after immersing the molded article in water for 2 days is preferably less than 1 mm, and more preferably less than 0.8 mm. When the amount of warpage is less than 1 mm, the dimensional and shape stability is excellent.

Molded Article

The molded article of the present invention is a molded article of the reinforced thermoplastic resin composition of the present invention.

Examples of the molding processing method of the reinforced thermoplastic resin composition include an injection molding method (including insert molding for producing films or glass plates), an injection compression molding method, an extrusion method, a blow molding method, a vacuum forming method, an air pressure molding method, a calendar molding method, an inflation molding method, and the like. Among these, the injection molding method or the injection compression molding method is preferable from the viewpoint that these are excellent in mass productivity and a molded article with high dimensional accuracy can be obtained.

For example, the molded article of the present invention can be applied not only to housings such as a personal computer (including a notebook type and a tablet type), a projector (including a liquid crystal projector), a television, a printer, a facsimile, a copying machine, an audio device, a game machine, a camera (including a video camera, a digital camera, and the like), video equipment (video, and the like), musical instruments, mobile equipment (an electronic organizer, an information portable terminal (PDA), and the like), lighting equipment, communication equipment (telephones (including mobile phones and smart phones), and the like), and the like, but also to fishing tackle, play equipment (pachinko goods, and the like), products for vehicles, products for furniture, sanitary products, products for building materials, and the like. Among these applications, it is suitable for a housing of a mobile device (such as a notebook type or tablet type personal computer and a mobile device including a smart phone, and the like) from the viewpoint that the effects of the present invention are particularly exhibited.

Since the molded article of the present invention is a molded article of the reinforced thermoplastic resin composition of the present invention, as described above, the molded article is excellent in weld strength, rigidity, impact resistance, mechanical strength, or heat resistance.

EXAMPLES

Hereinafter, specific examples will be described below. The present invention is not limited to these examples. "Parts" and "%" described below mean "parts by mass" and "% by mass", respectively.

Measurement Method and Evaluation Method

Acetone-soluble Component 2.5 g of the graft copolymer was immersed in 90 ml of acetone and heated at 65° C. for 3 hours, and thereafter centrifuged at 1500 rpm for 30 minutes using a centrifugal separator. Thereafter, the supernatant was removed and the residue was dried in a vacuum dryer at 65° C. for 12 hours, and thus the dried sample was precisely weighed. From the mass difference (2.5 g−mass of the sample after drying), the proportion (%) of the acetone-soluble component in the graft copolymer was determined. The reduced viscosity of the acetone-soluble component was measured at 25° C. using an N, N-dimethylformamide solution of 0.2 g/dl.

Charpy Impact Strength

The Charpy impact strength was measured in accordance with ISO 179.

Flexural Strength and Flexural Modulus

The flexural strength and the flexural modulus were measured in accordance with ISO 178. The flexural strength is an index of the mechanical strength of the molded article, and the flexural modulus is an index of the rigidity of the molded article.

Weld Strength

A liquid crystal display cover (thickness 1 mm) of an A4 size notebook type personal computer was molded under molding conditions of a molding temperature of 290° C., an injection speed of 99%, and a mold temperature of 85° C. by an injection molding machine (J350E, with 350t accumulator, manufactured by Japan Steel Works, Ltd.). The weld in the molded article was pushed with a one-point terminal and the test force (N) at the time of crack occurrence was measured, and thus this value was regarded as the weld strength.

Heat Resistance

The deflection temperature by the flatwise method with a load of 1.80 MPa was measured in accordance with ISO 75.

Moldability

A liquid crystal display cover (thickness 1 mm) of an A4 size notebook type personal computer was molded in the same manner as in the case of weld strength evaluation. Moldability was evaluated according to the following criteria depending on the presence or absence of a short shot (unfilled portion) during molding and presence or absence of sink marks or gas burning.

A: There were no unfilled portions, sink marks, or gas burning.

B: Some sink marks were seen.

C: Unfilled portions or gas burning was seen.

Warpage

A liquid crystal display cover (thickness 1 mm) of an A4 size notebook type personal computer was molded in the same manner as in the case of weld strength evaluation. The obtained molded article (liquid crystal display cover) was immersed in water for 2 days, and compared with the molded article before immersion, and the amount of warpage was evaluated according to the following criteria.

B: The amount of warpage is less than 1 mm.

C: The amount of warpage is 1 mm or more.

Each Component

Polycarbonate Resin (A) Novarex 7021PJ (viscosity-average molecular mass: 18,800) manufactured by Mitsubishi Engineering-Plastics Corporation was used as the polycarbonate resin (A-1).

Manufacturing of Graft Copolymer (B-1)

Copolymer latex (2 parts as solid content) having a volume-average particle diameter of 0.08 μm and including 85% n-butyl acrylate unit and 15% methacrylic acid unit was added with stirring to polybutadiene latex (100 parts as solid content) having a solid content concentration of 35% and a volume-average particle diameter of 0.08 μm. The mixture was stirred for 30 minutes to obtain butadiene-based rubbery polymer (B1-1) latex having a volume-average particle diameter of 0.28 μm.

The obtained butadiene-based rubbery polymer (B1-1) latex was charged in a reactor, and 100 parts of distilled water, 4 parts of wood rosin emulsifier, 0.4 parts of DEMOL N (naphthalene sulfonic acid formalin condensate manufactured by Kao Corporation), 0.04 parts of sodium hydroxide, and 0.7 parts of dextrose were added. The mixture was heated while stirring, and 0.1 parts of ferrous sulfate, 0.4 parts of sodium pyrophosphate, and 0.06 parts of sodium dithionite were added at the time of the internal temperature of 60° C. Thereafter, a mixture containing the following components was continuously added dropwise over 90 minutes, subsequently held for 1 hour and cooled.

Acrylonitrile 30 parts
Styrene 70 parts
Cumene hydroperoxide 0.4 parts
tert-Dodecyl mercaptan 1 part The obtained graft copolymer (B-1) latex was coagulated with dilute sulfuric acid, washed, filtered, and dried to obtain a dry powder of the graft copolymer (B-1). The acetone-soluble component content of the graft copolymer (B-1) was 27%. In addition, the reduced viscosity of the acetone-soluble component was 0.3 dl/g.

Manufacturing of Graft Copolymer (B-2)

The raw materials were charged into the reactor in the following proportions, and polymerized while stirring at 50° C. for 4 hours under nitrogen substitution to obtain a rubbery polymer (B1-2) latex.

n-Butyl acrylate 98 parts
1,3-Butylene glycol dimethacrylate 1 part
Allyl methacrylate 1 part
Sodium dioctylsulfosuccinate 2.0 parts
Deionized water 300 parts
Potassium persulfate 0.3 parts
Disodium phosphate 12-hydrate 0.5 parts
Sodium hydrogenphosphate 12-hydrate 0.3 parts The obtained rubbery polymer (B1-2) latex (100 parts as a solid content) was charged in a separate reactor, diluted with 280 parts of ion exchanged water, and heated to 70° C. Separately from the above, 0.7 parts of benzoyl peroxide was dissolved in 100 parts of a monomer mixture including acrylonitrile/styrene=29/71 (mass ratio) and was substituted with nitrogen. Thereafter, the monomer mixture was added to the reactor containing the rubbery polymer (B1-2) by a metering pump at a rate of 30 parts/hour. After all the monomer mixture was added, the temperature in the reactor was raised to 80° C. and stirring was continued for 30 minutes to obtain graft copolymer (B-2) latex. The polymerization rate was 99%.

The graft copolymer (B-2) latex was charged into a coagulation tank charged with a 0.15% aqueous solution (90° C.) of aluminum chloride ($AlCl_3.6H_2O$) three times the amount of the entire latex and was coagulated. After the entire latex was added, the temperature in the coagulation tank was raised to 93° C., and the temperature was maintained for 5 minutes and cooled. Thereafter, the mixture was drained and washed with a centrifugal separator and then dried to obtain a dry powder of the graft copolymer (B-2).

The acetone-soluble component content of the graft copolymer (B-2) was 21%. In addition, the reduced viscosity of the acetone-soluble component was 0.7 dl/g.

Manufacturing of Graft Copolymer (B-3)

A graft copolymer (B-3) having a rubbery polymer (B1-3) as a composite rubber of polybutadiene/polybutyl acrylate was obtained by the following method.

To the polybutadiene latex (20 parts as solid content) having a solid content concentration of 35% and a volume-average particle diameter of 0.08 μm, a copolymer latex (0.4 parts as solid content) including 82% of n-butyl acrylate unit and 18% methacrylic acid unit and having a volume-average particle diameter of 0.10 μm was added while stirring. The mixture was stirred for 30 minutes to obtain a diene-based rubber latex having a volume-average particle diameter of 0.36 μm.

The obtained diene-based rubber latex (20 parts as solid content) was charged in a reactor, 1 part of disproportionated potassium rosinate, 150 parts of ion-exchanged water, and a monomer mixture having the following composition were added, was substituted with nitrogen, and the temperature was raised to 50° C. (internal temperature).

n-Butyl acrylate 80 parts
Allyl methacrylate 0.32 parts
Ethylene glycol dimethacrylate 0.16 parts Furthermore, in the reactor, a solution prepared by dissolving 0.0002 parts of ferrous sulfate, 0.0006 parts of disodium ethylenediaminetetraacetate, and 0.25 parts of Rongalite was added in 10 parts of ion-exchanged water and reacted. The internal temperature at the end of the reaction was 75° C. Furthermore, the temperature was raised to 80° C. and the reaction was continued for 1 hour to obtain a rubbery polymer (B1-3) latex including the composite rubber of diene-based rubber and polybutyl acrylate-based rubber. The polymerization rate at this time was 98.8%.

The rubbery polymer (B1-3) latex (50 parts as a solid content) was charged in the reactor, 140 parts of ion exchanged water was added and diluted, and the temperature was raised to 70° C.

Separately from this, 0.35 parts of benzoyl peroxide was dissolved in 50 parts of a monomer mixture including acrylonitrile/styrene=29/71 (mass ratio) and was substituted with nitrogen. The monomer mixture was added to the reactor containing the rubbery polymer (B1-3) latex by a metering pump at a rate of 15 parts/hour. After all of the monomer mixture was added, the temperature in the reactor was raised to 80° C. and stirring was continued for 30 minutes to obtain a graft copolymer (B-3) latex. The polymerization rate at this time was 99%.

The graft copolymer (B-3) latex was introduced into a coagulation tank charged with a 0.5% aqueous solution of sulfuric acid (90° C.) three times the amount of the entire latex while stirring to coagulate. After the entire latex was added, the temperature inside the coagulation tank was raised to 93° C., the solution was maintained at this temperature for 5 minutes and cooled. Thereafter, the mixture was drained and washed with a centrifugal separator and then dried to obtain a dry powder of the graft copolymer (B-3).

The acetone-soluble component content of the graft copolymer (B-3) was 20%. In addition, the reduced viscosity of the acetone-soluble component was 0.7 dl/g.

Manufacturing of Graft Copolymer (B-4)

A graft copolymer (B-4) having a rubbery polymer (B1-4) as a composite rubber of polysiloxane rubber/polybutyl acrylate was obtained by the following method. 96 parts of octamethyltetracyclosiloxane, 2 parts of γ-methacryloxypropyldimethoxymethylsilane, and 2 parts of ethyl orthosilicate were mixed to obtain 100 parts of a siloxane-based mixture. 300 parts of distilled water in which 0.67 parts of sodium dodecylbenzenesulfonate was dissolved was added to this mixture, and stirred for 2 minutes at a rotation speed of 10,000 rpm with a homo mixer. Thereafter, the mixture was passed once through a homogenizer at a pressure of 30 MPa to obtain a stable premixed organosiloxane latex.

2 parts of dodecylbenzenesulfonic acid and 98 parts of distilled water were poured into a reactor equipped with a reagent injection vessel, a cooling tube, a jacket heater, and a stirring device to prepare a 2% aqueous dodecylbenzenesulfonic acid solution. In a state where this aqueous solution was heated to 85° C., the premixed organosiloxane latex was added dropwise over 4 hours, and after completion of the dropwise addition, the temperature was maintained for 1 hour and cooled. The reaction solution was kept at room temperature for 48 hours and then neutralized with an aqueous sodium hydroxide solution to obtain a polyorganosiloxane latex (L-1). A portion of the polyorganosiloxane latex (L-1) was dried at 170° C. for 30 minutes, and the solid content concentration was determined to be 17.3%.

119.5 parts of polyorganosiloxane latex (L-1) and 0.8 parts of sodium polyoxyethylene alkyl phenyl ether sulfate were charged into the reactor equipped with the reagent injection vessel, the cooling tube, the jacket heater, and the stirring device, and 203 parts of distilled water was added, and mixed. Thereafter, a mixture including 53.2 parts of n-butyl acrylate, 0.21 parts of allyl methacrylate, 0.11 parts of 1,3-butylene glycol dimethacrylate, and 0.13 parts of tert-butyl hydroperoxide was added. By passing a stream of nitrogen through this reactor, the atmosphere was replaced with nitrogen and the temperature was raised to 60° C. When the internal temperature of the reactor reached 60° C., an aqueous solution prepared by dissolving 0.0001 parts of ferrous sulfate, 0.0003 parts of disodium ethylenediaminetetraacetate, and 0.24 parts of Rongalite in 10 parts of distilled water was added, and radical polymerization was initiated. By the polymerization of the acrylate component, the liquid temperature was raised to 78° C. This state was maintained for 1 hour to complete the polymerization of the acrylate component to obtain a rubbery polymer (B1-4) latex including a composite rubber of polyorganosiloxane and butyl acrylate rubber.

After the liquid temperature inside the reactor had fallen to 60° C., an aqueous solution in which 0.4 parts of Rongalite was dissolved in 10 parts of distilled water was added. Subsequently, a mixture of 11.1 parts of acrylonitrile, 33.2 parts of styrene, and 0.2 parts of tert-butyl hydroperoxide was added dropwise over approximately 1 hour to polymerize. After completion of the dropwise addition, the solution was kept for 1 hour, and then an aqueous solution prepared by dissolving 0.0002 parts of ferrous sulfate, 0.0006 parts of disodium ethylenediaminetetraacetate, and 0.25 parts of Rongalite in 10 parts of distilled water was added. Subsequently, a mixture of 7.4 parts of acrylonitrile, 22.2 parts of styrene, and 0.1 part of tert-butyl hydroperoxide was added dropwise over approximately 40 minutes to polymerize. After completion of the dropwise addition, the mixture was kept for 1 hour and then cooled to obtain a graft copolymer (B-4) latex, obtained by grafting an acrylonitrile-styrene copolymer to a composite rubber (rubbery polymer (B1-4)) including polyorganosiloxane and butyl acrylate rubber.

150 parts of an aqueous solution in which calcium acetate was dissolved at a ratio of 5% were heated to 60° C. and stirred. 100 parts of the graft copolymer (B-4) latex was gradually added dropwise to the calcium acetate aqueous solution to solidify. The obtained coagulum was separated, washed, and dried to obtain a dry powder of the graft copolymer (B-4).

The acetone-soluble component content of the graft copolymer (B-4) was 26%. In addition, the reduced viscosity of the acetone-soluble component was 0.6 dl/g.

Inorganic Filler (D)

As an inorganic filler (D-1), carbon fiber chopped fiber (TR06U, manufactured by Mitsubishi Rayon Co., Ltd., surface treatment agent: polyurethane) was used.

As an inorganic filler (D-2), glass fiber chopped fiber (CSG3PA-820, manufactured by Nitto Boseki Co., surface treatment agent: polyurethane, the ratio of major axis/minor axis: 4) was used.

As an inorganic filler (D-3), glass fiber chopped fiber (CSH3PA-870, manufactured by Nitto Boseki Co., surface treatment agent: polyurethane, the ratio of major axis/minor axis: 2) was used.

As an inorganic filler (D-4), glass fiber chopped fiber (CSH3PA-850, manufactured by Nitto Boseki Co., surface treatment agent: epoxy resin, the ratio of major axis/minor axis: 2) was used.

As an inorganic filler (D-5), glass fiber chopped fiber (CS3PE-455, manufactured by Nitto Boseki Co., Ltd., surface treatment agent: polyurethane, the ratio of major axis/minor axis: 1) was used.

Glycidyl Ether Unit-containing Polymer (E)

As a glycidyl ether unit-containing polymer (E-1), an epoxy group-containing phenoxy resin (manufactured by Mitsubishi Chemical Corporation, jER 4250, mass-average molecular mass: 60,000) was used.

As a glycidyl ether unit-containing polymer (E-2), an epoxy group-containing phenoxy resin (manufactured by Mitsubishi Chemical Corporation, jER 1256, mass-average molecular mass: 50,000) was used.

As a glycidyl ether unit-containing polymer (E-3), a bisphenol A type epoxy resin (manufactured by Mitsubishi Chemical Corporation, jER 1010, mass-average molecular mass: 5,500) was used.

As a glycidyl ether unit-containing polymer (E-4), a bisphenol A type epoxy resin (manufactured by Mitsubishi Chemical Corporation, jER 1009, mass-average molecular mass: 3,800) was used.

As a glycidyl ether unit-containing polymer (E-5), a bisphenol A type epoxy resin (manufactured by Mitsubishi Chemical Corporation, jER 1004, mass-average molecular mass: 1,650) was used.

Manufacturing of Glycidyl Ether Unit-containing Polymer (E-6)

82.42 parts of a bisphenol A type epoxy resin (epoxy equivalent: 467 g/eq), 6.3 parts of bisphenol A type liquid epoxy resin (epoxy equivalent weight: 210 g/eq, hydrolyzable chlorine: 1.79%), 13.95 parts of bisphenol A, 19.6 parts of p-cumyl phenol, 7.5 parts of polyester resin (GV-335, manufactured by Nippon U-pica Co., Ltd., acid value: 30 KOH mg/g), and 30 parts of xylene were charged into a separable flask having a capacity of 500 ml equipped with a stirrer, a thermometer, a nitrogen inlet, and a cooling tube and heated under a nitrogen atmosphere to raise the temperature. When the internal temperature of the reaction system reached 80° C., 0.18 parts of a 5% lithium chloride aqueous solution was added and the temperature was further raised. When the internal temperature of the reaction system reached 130° C., the pressure inside the reaction system was reduced and xylene and water were extracted to the outside of the system. Thereafter, the reaction was performed while maintaining the reaction temperature at 160° C., and after 1 hour, nitrogen was introduced into the reaction system to return the internal pressure of the reaction system to normal pressure. After 7 hours from the time when the reaction temperature reached 160° C., 20.25 parts of a high-molecular-weight bisphenol A type epoxy resin (epoxy equivalent: 2700 g/eq) was added and stirred for 1 hour. Thereafter, 100 parts of polyester resin (GV-730, manufactured by Nippon U-pica Co., Ltd., acid value: 3 KOH mg/g) was added and reacted at 180° C. for 10 hours to obtain a high-molecular-weight epoxy resin. In order to subject the obtained high-molecular-weight epoxy resin to molecular weight measurement by GPC, when trying to dissolve 0.1 g of the sample in 10 ml of tetrahydrofuran, approximately 0.05 g was insoluble. After filtering through 5C filter paper, when the filtrate was subjected to molecular weight measurement by GPC, the mass-average molecular mass was 70,200.

Polyamide 6/66 (F)

As a polyamide 6/66 (F-1), a polyamide 6/66 copolymer (manufactured by Ube Industries, Ltd., 5023B, relative viscosity: 3.0, moisture content: 0.1%) was used.

As a polyamide 6/66 (F-2), a polyamide 6/66 copolymer (manufactured by Ube Industries, Ltd., 5013B, relative viscosity: 2.5, moisture content: 0.1%) was used.

As a polyamide 6/66 (F-3), a polyamide 6/66 copolymer (manufactured by Ube Industries, Ltd., 5023B, relative viscosity: 3.0, moisture content: 0.2%) was used.

As a polyamide (F-4), a polyamide 66 (manufactured by Asahi Chemical Industry Co., Ltd., 1500, relative viscosity: 3.7, moisture content: 0.1%) was used.

As a polyamide (F-5), a polyamide 6 (manufactured by Ube Industries, Ltd., 1022B, relative viscosity: 3.4, moisture content: 0.1%) was used.

As a polyamide (F-6), a polyamide 6 (manufactured by Ube Industries, Ltd., 1013B, relative viscosity: 2.6, moisture content: 0.1%) was used.

(F-1) was used immediately after opening the product bag, and (F-3) used after one week passed after opening the product bag.

Phosphate Ester-Based Flame Retardant(G)

As a phosphate ester-based flame retardant (G-1), bisphenol A bis (diphenyl phosphate) (manufactured by Ajinomoto Fine-Techno Co., Ltd., BAPP, mass-average molecular mass: 692, catalog value) was used.

As a phosphate ester-based flame retardant (G-2), phenylene bis (dixylyl phosphate) (manufactured by Daihachi Chemical Industry Co., Ltd. PX-200, mass-average molecular mass: 686, catalog value) was used.

As a phosphate ester-based flame retardant (G-3), phenylene bis (diphenyl phosphate) (manufactured by Daihachi Chemical Co., Ltd., CR-733S, mass-average molecular mass: 574, catalog value) was used.

As a phosphate ester-based flame retardant (G-4), triphenyl phosphate (manufactured by Daihachi Chemical Industry Co., Ltd. TPP, mass-average molecular mass: 326, catalog value) was used.

Flame Retardant Aid (H)

As a flame retardant aid (H-1), polytetrafluoroethylene (PTFE) was used.

Examples 1 to 32 and Comparative Examples 1 to 11

Each of the above-described components was blended in a composition as illustrated in the following Tables 1 to 7 and kneaded using a twin screw extruder to obtain pellets of a reinforced thermoplastic resin composition. The obtained pellets were dried at 100° C. for 3 hours and then evaluated for moldability by injection molding. In addition, the Charpy impact strength, the flexural strength, the flexural modulus, the weld strength, the heat resistance, and the warpage of the obtained molded article were measured. Evaluation results are illustrated in Tables 1 to 7 below.

TABLE 1

| | | | | Example 1 | Example 2 | Example 3 | Example 4 | Example 5 | Example 6 | Example 7 |
|---|---|---|---|---|---|---|---|---|---|---|
| Reinforced Thermoplastic Resin Composition | C | A % | A-1 | 50 | 80 | 80 | 100 | 95 | 95 | 95 |
| | | B % | B-1 | 0 | 0 | 0 | 0 | 0 | 0 | 0 |
| | | | B-2 | 0 | 0 | 0 | 0 | 0 | 0 | 0 |
| | | | B-3 | 0 | 0 | 0 | 0 | 0 | 0 | 0 |
| | | | B-4 | 50 | 20 | 20 | 0 | 5 | 5 | 5 |
| | D Parts | | D-1 | 0 | 0 | 0 | 0 | 34.2 | 0 | 0 |
| | | | D-2 | 28.5 | 28.5 | 28.7 | 111.9 | 0 | 34.2 | 58.6 |
| | | | D-3 | 0 | 0 | 0 | 0 | 0 | 0 | 0 |
| | | | D-4 | 0 | 0 | 0 | 0 | 0 | 0 | 0 |
| | | | D-5 | 0 | 0 | 0 | 0 | 0 | 0 | 0 |
| | E Parts | | E-1 | 0 | 0 | 0 | 0 | 0 | 0 | 0 |
| | | | E-2 | 8 | 8 | 8 | 8 | 8 | 8 | 8 |
| | | | E-3 | 0 | 0 | 0 | 0 | 0 | 0 | 0 |
| | | | E-4 | 0 | 0 | 0 | 0 | 0 | 0 | 0 |
| | | | E-5 | 0 | 0 | 0 | 0 | 0 | 0 | 0 |
| | | | E-6 | 0 | 0 | 0 | 0 | 0 | 0 | 0 |
| | F Parts | | F-1 | 5 | 5 | 5 | 5 | 5 | 5 | 5 |
| | | | F-2 | 0 | 0 | 0 | 0 | 0 | 0 | 0 |
| | | | F-3 | 0 | 0 | 0 | 0 | 0 | 0 | 0 |
| | | | F-4 | 0 | 0 | 0 | 0 | 0 | 0 | 0 |
| | | | F-5 | 0 | 0 | 0 | 0 | 0 | 0 | 0 |
| | | | F-6 | 0 | 0 | 0 | 0 | 0 | 0 | 0 |
| | G Parts | | G-1 | 0 | 0 | 0 | 0 | 0 | 0 | 0 |
| | | | G-2 | 0 | 0 | 1 | 23 | 23 | 23 | 23 |
| | | | G-3 | 0 | 0 | 0 | 0 | 0 | 0 | 0 |
| | | | G-4 | 0 | 0 | 0 | 0 | 0 | 0 | 0 |
| | H Parts | | H-1 | 0.8 | 0.8 | 0.8 | 0.8 | 0.8 | 0.8 | 0.8 |
| | Proportion of D % | | | 20 | 20 | 20 | 45 | 20 | 20 | 30 |
| Evaluation | Charpy Impact Strength kJ/m$^2$ | | | 8 | 10 | 10 | 14 | 10 | 10 | 13 |
| | Flexural Strength MPa | | | 108 | 133 | 136 | 241 | 227 | 158 | 206 |
| | Flexural Modulus MPa | | | 4100 | 5100 | 5300 | 13400 | 13100 | 6100 | 10000 |
| | Weld Strength N | | | 197 | 202 | 202 | 248 | 225 | 218 | 230 |
| | Deflection Temperature ° C. | | | 99 | 130 | 128 | 99 | 91 | 91 | 95 |
| | Moldability | | | A | A | A | B | A | A | A |
| | Warpage | | | B | B | B | B | B | B | B |

TABLE 2

| | | | | Example 8 | Example 9 | Example 10 | Example 11 | Example 12 | Example 13 | Example 14 |
|---|---|---|---|---|---|---|---|---|---|---|
| Reinforced Thermoplastic Resin Composition | C | A % | A-1 | 95 | 95 | 95 | 95 | 95 | 95 | 95 |
| | | B % | B-1 | 0 | 0 | 0 | 0 | 0 | 5 | 0 |
| | | | B-2 | 0 | 0 | 0 | 0 | 0 | 0 | 5 |
| | | | B-3 | 0 | 0 | 0 | 0 | 0 | 0 | 0 |
| | | | B-4 | 5 | 5 | 5 | 5 | 5 | 0 | 0 |
| | D Parts | | D-1 | 0 | 0 | 0 | 0 | 0 | 0 | 0 |
| | | | D-2 | 111.9 | 136.8 | 0 | 0 | 0 | 111.9 | 111.9 |
| | | | D-3 | 0 | 0 | 111.9 | 0 | 0 | 0 | 0 |
| | | | D-4 | 0 | 0 | 0 | 111.9 | 0 | 0 | 0 |
| | | | D-5 | 0 | 0 | 0 | 0 | 111.9 | 0 | 0 |
| | E Parts | | E-1 | 0 | 0 | 0 | 0 | 0 | 0 | 0 |
| | | | E-2 | 8 | 8 | 8 | 8 | 8 | 8 | 8 |

TABLE 2-continued

|  |  |  | Example 8 | Example 9 | Example 10 | Example 11 | Example 12 | Example 13 | Example 14 |
|---|---|---|---|---|---|---|---|---|---|
|  |  | E-3 | 0 | 0 | 0 | 0 | 0 | 0 | 0 |
|  |  | E-4 | 0 | 0 | 0 | 0 | 0 | 0 | 0 |
|  |  | E-5 | 0 | 0 | 0 | 0 | 0 | 0 | 0 |
|  |  | E-6 | 0 | 0 | 0 | 0 | 0 | 0 | 0 |
|  | F Parts | F-1 | 5 | 5 | 5 | 5 | 5 | 5 | 5 |
|  |  | F-2 | 0 | 0 | 0 | 0 | 0 | 0 | 0 |
|  |  | F-3 | 0 | 0 | 0 | 0 | 0 | 0 | 0 |
|  |  | F-4 | 0 | 0 | 0 | 0 | 0 | 0 | 0 |
|  |  | F-5 | 0 | 0 | 0 | 0 | 0 | 0 | 0 |
|  |  | F-6 | 0 | 0 | 0 | 0 | 0 | 0 | 0 |
|  | G Parts | G-1 | 0 | 0 | 0 | 0 | 0 | 0 | 0 |
|  |  | G-2 | 23 | 23 | 23 | 23 | 23 | 23 | 23 |
|  |  | G-3 | 0 | 0 | 0 | 0 | 0 | 0 | 0 |
|  |  | G-4 | 0 | 0 | 0 | 0 | 0 | 0 | 0 |
|  | H Parts | H-1 | 0.8 | 0.8 | 0.8 | 0.8 | 0.8 | 0.8 | 0.8 |
|  | Proportion of D % |  | 45 | 50 | 45 | 45 | 45 | 45 | 45 |
| Evaluation | Charpy Impact Strength kJ/m$^2$ |  | 17 | 16 | 12 | 10 | 8 | 16 | 16 |
|  | Flexural Strength MPa |  | 237 | 252 | 226 | 204 | 190 | 229 | 234 |
|  | Flexural Modulus MPa |  | 13500 | 14600 | 13200 | 13000 | 12700 | 13500 | 13400 |
|  | Weld Strength N |  | 246 | 251 | 235 | 221 | 214 | 240 | 245 |
|  | Deflection Temperature ° C. |  | 97 | 97 | 97 | 97 | 96 | 97 | 96 |
|  | Moldability |  | A | B | A | A | A | A | A |
|  | Warpage |  | B | B | B | B | B | B | B |

TABLE 3

|  |  |  |  | Example 15 | Example 16 | Example 17 | Example 18 | Example 19 | Example 20 | Example 21 |
|---|---|---|---|---|---|---|---|---|---|---|
| Reinforced Thermoplastic Resin Composition | C | A % | A-1 | 95 | 95 | 95 | 95 | 95 | 95 | 95 |
|  |  | B % | B-1 | 0 | 0 | 0 | 0 | 0 | 0 | 0 |
|  |  |  | B-2 | 0 | 0 | 0 | 0 | 0 | 0 | 0 |
|  |  |  | B-3 | 5 | 0 | 0 | 0 | 0 | 0 | 0 |
|  |  |  | B-4 | 0 | 5 | 5 | 5 | 5 | 5 | 5 |
|  | D Parts |  | D-1 | 0 | 0 | 0 | 0 | 0 | 0 | 0 |
|  |  |  | D-2 | 111.9 | 106.2 | 107.8 | 113.6 | 93.9 | 95.6 | 113.6 |
|  |  |  | D-3 | 0 | 0 | 0 | 0 | 0 | 0 | 0 |
|  |  |  | D-4 | 0 | 0 | 0 | 0 | 0 | 0 | 0 |
|  |  |  | D-5 | 0 | 0 | 0 | 0 | 0 | 0 | 0 |
|  | E Parts |  | E-1 | 0 | 0 | 0 | 0 | 0 | 0 | 0 |
|  |  |  | E-2 | 8 | 1 | 3 | 10 | 8 | 8 | 8 |
|  |  |  | E-3 | 0 | 0 | 0 | 0 | 0 | 0 | 0 |
|  |  |  | E-4 | 0 | 0 | 0 | 0 | 0 | 0 | 0 |
|  |  |  | E-5 | 0 | 0 | 0 | 0 | 0 | 0 | 0 |
|  |  |  | E-6 | 0 | 0 | 0 | 0 | 0 | 0 | 0 |
|  | F Parts |  | F-1 | 5 | 5 | 5 | 5 | 5 | 5 | 5 |
|  |  |  | F-2 | 0 | 0 | 0 | 0 | 0 | 0 | 0 |
|  |  |  | F-3 | 0 | 0 | 0 | 0 | 0 | 0 | 0 |
|  |  |  | F-4 | 0 | 0 | 0 | 0 | 0 | 0 | 0 |
|  |  |  | F-5 | 0 | 0 | 0 | 0 | 0 | 0 | 0 |
|  |  |  | F-6 | 0 | 0 | 0 | 0 | 0 | 0 | 0 |
|  | G Parts |  | G-1 | 0 | 0 | 0 | 0 | 0 | 0 | 0 |
|  |  |  | G-2 | 23 | 23 | 23 | 23 | 1 | 3 | 25 |
|  |  |  | G-3 | 0 | 0 | 0 | 0 | 0 | 0 | 0 |
|  |  |  | G-4 | 0 | 0 | 0 | 0 | 0 | 0 | 0 |
|  | H Parts |  | H-1 | 0.8 | 0.8 | 0.8 | 0.8 | 0.8 | 0.8 | 0.8 |
|  | Proportion of D % |  |  | 45 | 45 | 45 | 45 | 45 | 45 | 45 |
| Evaluation | Charpy Impact Strength kJ/m$^2$ |  |  | 16 | 9 | 11 | 17 | 21 | 20 | 16 |
|  | Flexural Strength MPa |  |  | 239 | 158 | 165 | 239 | 159 | 163 | 239 |
|  | Flexural Modulus MPa |  |  | 13400 | 13100 | 13200 | 13600 | 9600 | 9800 | 13700 |
|  | Weld Strength N |  |  | 247 | 198 | 210 | 249 | 260 | 257 | 245 |
|  | Deflection Temperature ° C. |  |  | 97 | 97 | 97 | 98 | 127 | 123 | 94 |
|  | Moldability |  |  | A | A | A | B | B | A | A |
|  | Warpage |  |  | B | B | B | B | B | B | B |

TABLE 4

|  |  |  | Example 22 | Example 23 | Example 24 | Example 25 | Example 26 | Example 27 | Example 28 |
|---|---|---|---|---|---|---|---|---|---|
| Reinforced Thermoplastic Resin Composition | C A% | A-1 | 95 | 95 | 95 | 95 | 95 | 95 | 95 |
|  | B% | B-1 | 0 | 0 | 0 | 0 | 0 | 0 | 0 |
|  |  | B-2 | 0 | 0 | 0 | 0 | 0 | 0 | 0 |
|  |  | B-3 | 0 | 0 | 0 | 0 | 0 | 0 | 0 |
|  |  | B-4 | 5 | 5 | 5 | 5 | 5 | 5 | 5 |
|  | D Parts | D-1 | 0 | 0 | 0 | 0 | 0 | 0 | 0 |
|  |  | D-2 | 111.9 | 111.9 | 111.9 | 111.9 | 108.7 | 110.3 | 116.0 |
|  |  | D-3 | 0 | 0 | 0 | 0 | 0 | 0 | 0 |
|  |  | D-4 | 0 | 0 | 0 | 0 | 0 | 0 | 0 |
|  |  | D-5 | 0 | 0 | 0 | 0 | 0 | 0 | 0 |
|  | E Parts | E-1 | 0 | 0 | 0 | 0 | 0 | 0 | 0 |
|  |  | E-2 | 8 | 8 | 8 | 8 | 8 | 8 | 8 |
|  |  | E-3 | 0 | 0 | 0 | 0 | 0 | 0 | 0 |
|  |  | E-4 | 0 | 0 | 0 | 0 | 0 | 0 | 0 |
|  |  | E-5 | 0 | 0 | 0 | 0 | 0 | 0 | 0 |
|  |  | E-6 | 0 | 0 | 0 | 0 | 0 | 0 | 0 |
|  | F Parts | F-1 | 5 | 5 | 5 | 0 | 1 | 3 | 10 |
|  |  | F-2 | 0 | 0 | 0 | 5 | 0 | 0 | 0 |
|  |  | F-3 | 0 | 0 | 0 | 0 | 0 | 0 | 0 |
|  |  | F-4 | 0 | 0 | 0 | 0 | 0 | 0 | 0 |
|  |  | F-5 | 0 | 0 | 0 | 0 | 0 | 0 | 0 |
|  |  | F-6 | 0 | 0 | 0 | 0 | 0 | 0 | 0 |
|  | G Parts | G-1 | 23 | 0 | 0 | 0 | 0 | 0 | 0 |
|  |  | G-2 | 0 | 0 | 0 | 23 | 23 | 23 | 23 |
|  |  | G-3 | 0 | 23 | 0 | 0 | 0 | 0 | 0 |
|  |  | G-4 | 0 | 0 | 23 | 0 | 0 | 0 | 0 |
|  | H Parts | H-1 | 0.8 | 0.8 | 0.8 | 0.8 | 0.8 | 0.8 | 0.8 |
|  | Proportion of D % |  | 45 | 45 | 45 | 45 | 45 | 45 | 45 |
| Evaluation | Charpy Impact Strength kJ/m$^2$ |  | 16 | 17 | 17 | 15 | 16 | 17 | 17 |
|  | Flexural Strength MPa |  | 251 | 253 | 254 | 240 | 225 | 230 | 246 |
|  | Flexural Modulus MPa |  | 13900 | 13900 | 13900 | 13500 | 13500 | 13500 | 13600 |
|  | Weld Strength N |  | 246 | 245 | 244 | 252 | 189 | 195 | 244 |
|  | Deflection Temperature °C. |  | 97 | 96 | 94 | 97 | 98 | 97 | 97 |
|  | Moldability |  | A | A | B | A | A | A | A |
|  | Warpage |  | B | B | B | B | B | B | B |

TABLE 5

|  |  |  | Example 29 | Example 30 | Example 31 | Example 32 |
|---|---|---|---|---|---|---|
| Reinforced Thermoplastic Resin Composition | C A% | A-1 | 95 | 95 | 95 | 95 |
|  | B% | B-1 | 0 | 0 | 0 | 0 |
|  |  | B-2 | 0 | 0 | 0 | 0 |
|  |  | B-3 | 0 | 0 | 0 | 0 |
|  |  | B-4 | 5 | 5 | 5 | 5 |
|  | D Parts | D-1 | 0 | 0 | 0 | 0 |
|  |  | D-2 | 120.1 | 111.9 | 111.9 | 111.9 |
|  |  | D-3 | 0 | 0 | 0 | 0 |
|  |  | D-4 | 0 | 0 | 0 | 0 |
|  |  | D-5 | 0 | 0 | 0 | 0 |
|  | E Parts | E-1 | 0 | 0 | 0 | 0 |
|  |  | E-2 | 8 | 0 | 0 | 0 |
|  |  | E-3 | 0 | 0 | 8 | 0 |
|  |  | E-4 | 0 | 0 | 0 | 8 |
|  |  | E-5 | 0 | 0 | 0 | 0 |
|  |  | E-6 | 0 | 0 | 0 | 0 |
|  | F Parts | F-1 | 15 | 5 | 5 | 5 |
|  |  | F-2 | 0 | 0 | 0 | 0 |
|  |  | F-3 | 0 | 0 | 0 | 0 |
|  |  | F-4 | 0 | 0 | 0 | 0 |
|  |  | F-5 | 0 | 0 | 0 | 0 |
|  |  | F-6 | 0 | 0 | 0 | 0 |
|  | G Parts | G-1 | 0 | 0 | 0 | 0 |
|  |  | G-2 | 23 | 23 | 23 | 23 |
|  |  | G-3 | 0 | 0 | 0 | 0 |
|  |  | G-4 | 0 | 0 | 0 | 0 |
|  | H Parts | H-1 | 0.8 | 0.8 | 0.8 | 0.8 |
|  | Proportion of D % |  | 45 | 45 | 45 | 45 |

TABLE 5-continued

|  |  | Example 29 | Example 30 | Example 31 | Example 32 |
|---|---|---|---|---|---|
| Evaluation | Charpy Impact Strength kJ/m$^2$ | 16 | 17 | 17 | 17 |
|  | Flexural Strength MPa | 245 | 265 | 262 | 262 |
|  | Flexural Modulus MPa | 13500 | 14200 | 14100 | 14100 |
|  | Weld Strength N | 216 | 244 | 246 | 243 |
|  | Deflection Temperature ° C. | 98 | 97 | 97 | 97 |
|  | Moldability | A | A | A | A |
|  | Warpage | B | B | B | B |

TABLE 6

|  |  |  |  | Comparative Example 1 | Comparative Example 2 | Comparative Example 3 | Comparative Example 4 | Comparative Example 5 | Comparative Example 6 |
|---|---|---|---|---|---|---|---|---|---|
| Reinforced Thermoplastic Resin Composition | C | A % | A-1 | 45 | 100 | 95 | 95 | 95 | 95 |
|  |  | B % | B-1 | 0 | 0 | 0 | 0 | 0 | 0 |
|  |  |  | B-2 | 0 | 0 | 0 | 0 | 0 | 0 |
|  |  |  | B-3 | 0 | 0 | 0 | 0 | 0 | 0 |
|  |  |  | B-4 | 55 | 0 | 5 | 5 | 5 | 5 |
|  | D Parts |  | D-1 | 0 | 0 | 0 | 0 | 0 | 0 |
|  |  |  | D-2 | 0 | 167.2 | 105.4 | 107.8 | 140.8 | 124.2 |
|  |  |  | D-3 | 0 | 0 | 0 | 0 | 0 | 0 |
|  |  |  | D-4 | 0 | 0 | 0 | 0 | 0 | 0 |
|  |  |  | D-5 | 27.9 | 0 | 0 | 0 | 0 | 0 |
|  | E Parts |  | E-1 | 0 | 0 | 0 | 0 | 0 | 0 |
|  |  |  | E-2 | 8 | 8 | 0 | 8 | 0 | 8 |
|  |  |  | E-3 | 0 | 0 | 0 | 0 | 0 | 0 |
|  |  |  | E-4 | 0 | 0 | 0 | 0 | 0 | 0 |
|  |  |  | E-5 | 0 | 0 | 0 | 0 | 0 | 0 |
|  |  |  | E-6 | 0 | 0 | 0 | 0 | 12 | 0 |
|  | F Parts |  | F-1 | 5 | 5 | 5 | 0 | 5 | 20 |
|  |  |  | F-2 | 0 | 0 | 0 | 0 | 0 | 0 |
|  |  |  | F-3 | 0 | 0 | 0 | 0 | 0 | 0 |
|  |  |  | F-4 | 0 | 0 | 0 | 0 | 0 | 0 |
|  |  |  | F-5 | 0 | 0 | 0 | 0 | 0 | 0 |
|  |  |  | F-6 | 0 | 0 | 0 | 0 | 0 | 0 |
|  | G Parts |  | G-1 | 0 | 0 | 0 | 0 | 0 | 0 |
|  |  |  | G-2 | 0 | 23 | 23 | 23 | 23 | 23 |
|  |  |  | G-3 | 0 | 0 | 0 | 0 | 0 | 0 |
|  |  |  | G-4 | 0 | 0 | 0 | 0 | 0 | 0 |
|  | H Parts |  | H-1 | 0.8 | 0.8 | 0.8 | 0.8 | 0.8 | 0.8 |
|  | Proportion of D % |  |  | 20 | 55 | 45 | 45 | 50 | 45 |
| Evaluation | Charpy Impact Strength kJ/m$^2$ |  |  | 5 | 14 | 7 | 15 | 17 | 14 |
|  | Flexural Strength MPa |  |  | 103 | 253 | 179 | 229 | 258 | 244 |
|  | Flexural Modulus MPa |  |  | 3900 | 15200 | 13100 | 13600 | 14200 | 13300 |
|  | Weld Strength N |  |  | 191 | 257 | 182 | 157 | 255 | 167 |
|  | Deflection Temperature ° C. |  |  | 92 | 98 | 97 | 98 | 98 | 98 |
|  | Moldability |  |  | A | C | A | A | C | A |
|  | Warpage |  |  | B | B | B | B | B | C |

TABLE 7

|  |  |  |  | Comparative Example 7 | Comparative Example 8 | Comparative Example 9 | Comparative Example 10 | Comparative Example 11 |
|---|---|---|---|---|---|---|---|---|
| Reinforced Thermoplastic Resin Composition | C | A % | A-1 | 95 | 95 | 95 | 95 | 95 |
|  |  | B % | B-1 | 0 | 0 | 0 | 0 | 0 |
|  |  |  | B-2 | 0 | 0 | 0 | 0 | 0 |
|  |  |  | B-3 | 0 | 0 | 0 | 0 | 0 |
|  |  |  | B-4 | 5 | 5 | 5 | 5 | 5 |
|  | D Parts |  | D-1 | 0 | 0 | 0 | 0 | 0 |
|  |  |  | D-2 | 111.9 | 111.9 | 111.9 | 111.9 | 111.9 |
|  |  |  | D-3 | 0 | 0 | 0 | 0 | 0 |
|  |  |  | D-4 | 0 | 0 | 0 | 0 | 0 |
|  |  |  | D-5 | 0 | 0 | 0 | 0 | 0 |

TABLE 7-continued

|  |  |  | Comparative Example 7 | Comparative Example 8 | Comparative Example 9 | Comparative Example 10 | Comparative Example 11 |
|---|---|---|---|---|---|---|---|
|  | E Parts | E-1 | 0 | 0 | 0 | 0 | 0 |
|  |  | E-2 | 0 | 8 | 0 | 8 | 0 |
|  |  | E-3 | 0 | 0 | 0 | 0 | 0 |
|  |  | E-4 | 0 | 0 | 0 | 0 | 0 |
|  |  | E-5 | 8 | 0 | 8 | 0 | 8 |
|  |  | E-6 | 0 | 0 | 0 | 0 | 0 |
|  | F Parts | F-1 | 5 | 0 | 0 | 0 | 0 |
|  |  | F-2 | 0 | 0 | 0 | 0 | 0 |
|  |  | F-3 | 0 | 5 | 0 | 0 | 0 |
|  |  | F-4 | 0 | 0 | 5 | 0 | 0 |
|  |  | F-5 | 0 | 0 | 0 | 5 | 0 |
|  |  | F-6 | 0 | 0 | 0 | 0 | 5 |
|  | G Parts | G-1 | 0 | 0 | 0 | 0 | 0 |
|  |  | G-2 | 23 | 23 | 23 | 23 | 23 |
|  |  | G-3 | 0 | 0 | 0 | 0 | 0 |
|  |  | G-4 | 0 | 0 | 0 | 0 | 0 |
|  | H Parts | H-1 | 0.8 | 0.8 | 0.8 | 0.8 | 0.8 |
|  | Proportion of D % |  | 45 | 45 | 45 | 45 | 45 |
| Evaluation | Charpy Impact Strength kJ/m$^2$ |  | 5 | 15 | 16 | 20 | 18 |
|  | Flexural Strength MPa |  | 234 | 236 | 264 | 263 | 266 |
|  | Flexural Modulus MPa |  | 13400 | 13300 | 14700 | 14500 | 14500 |
|  | Weld Strength N |  | 237 | 180 | 154 | 188 | 194 |
|  | Deflection Temperature ° C. |  | 99 | 87 | 98 | 98 | 98 |
|  | Moldability |  | A | A | A | A | A |
|  | Warpage |  | B | B | B | B | B |

The amounts of the inorganic filler (D), the glycidyl ether unit-containing polymer (E), the polyamide 6/66 (F), the phosphate ester-based flame retardant (G), and the flame retardant aid (H) illustrated in Tables 1 to 7 are the amount (parts) relative to 100 parts of the resin main component (C) including the polycarbonate resin (A) and the graft copolymer (B). In addition, "proportion of D" illustrated in Tables 1 to 7 is the proportion (%) of the inorganic filler (D) to the total mass (100% by mass) of the reinforced thermoplastic resin composition.

As illustrated in Tables 1 to 5, the reinforced thermoplastic resin composition obtained in each Example was excellent in moldability. In addition, from the reinforced thermoplastic resin composition obtained in each Example, a molded article excellent in the weld strength, the rigidity, the impact resistance, the mechanical strength, and the heat resistance, and in which the warpage due to moisture absorption was suppressed was obtained.

On the other hand, as illustrated in Tables 6 and 7, in the cases of Comparative Examples 1 to 11, any item of the moldability of the reinforced thermoplastic resin composition, the weld strength, the rigidity, the impact resistance, the mechanical strength, and the heat resistance of the molded article was inferior.

Specifically, in the case of Comparative Example 1 in which the proportion of the polycarbonate resin (A) was low and the proportion of the graft copolymer (B) was high, the impact resistance and the weld strength were inferior.

In the case of Comparative Example 2 in which the proportion of the inorganic filler (D) is high, the moldability was inferior.

In the case of Comparative Example 3 not containing the glycidyl ether unit-containing polymer (E), the impact resistance and the weld strength were inferior.

In the case of Comparative Example 4 not containing the polyamide 6/66 (F), the weld strength was inferior.

In the case of Comparative Example 5 in which the mass-average molecular mass of the glycidyl ether unit-containing polymer (E) was 70,200, the moldability was inferior.

In the case of Comparative Example 6 in which the proportion of polyamide 6/66 (F) was high, the weld strength was inferior. In addition, warpage due to moisture absorption occurred.

In the case of Comparative Example 7 in which the mass-average molecular mass of the glycidyl ether unit-containing polymer (E) was 1,650, the impact resistance was inferior.

In the case of Comparative Example 8 in which the moisture content of the polyamide 6/66 (F) was 0.2%, the weld strength and the heat resistance were inferior.

In the cases of Comparative Examples 9 to 11 containing a polyamide other than the polyamide 6/66 (F), the weld strength was inferior.

In addition, from the comparison between Example 8 and Comparative Example 3, it is understood that the reinforced thermoplastic resin composition of the present invention is superior to a reinforced thermoplastic resin composition not containing the glycidyl ether unit-containing polymer (E) in the impact resistance, the mechanical strength, and the weld strength when processed into the molded article.

From the comparison between Example 8 and Comparative Example 4, it is understood that the reinforced thermoplastic resin composition of the present invention is superior to a reinforced thermoplastic resin composition not containing the polyamide 6/66 (F) having a moisture content of 0.1% or less in the weld strength when processed into the molded article.

From the comparison between Example 8 and Comparative Example 8, it is understood that the reinforced thermoplastic resin composition of the present invention is superior to a reinforced thermoplastic resin composition containing the polyamide 6/66 (F) having a moisture content exceeding 0.1% in the weld strength and the heat resistance when processed into the molded article.

From the comparison between Example 8 and Comparative Examples 9 to 11, it is understood that the reinforced thermoplastic resin composition of the present invention is superior to a reinforced thermoplastic resin composition containing polyamide other than the polyamide 6/66 (F) in the weld strength when processed into the molded article.

The reinforced thermoplastic resin composition of the present invention is particularly useful as a material of the housing of the mobile devices (a notebook type or tablet type personal computer, a mobile phone including a smart phone, a digital camera, a digital video camera, and the like).

We claim:

1. A reinforced thermoplastic resin composition, comprising:
    a resin main component (C) including 80% to 95% by mass of a polycarbonate resin (A) and 5% to 20% by mass of a graft copolymer (B) obtained by polymerizing a monomer mixture containing an aromatic alkenyl compound monomer (a) and a vinyl cyanide compound monomer (b) in the presence of a rubbery polymer (B1) (here, total of the polycarbonate resin (A) and the graft copolymer (B) is 100% by mass);
    an inorganic filler (D);
    a glycidyl ether unit-containing polymer (E) having a glycidyl ether unit and a mass-average molecular mass of 3,800 to 60,000 (here, the graft copolymer (B) is excluded); and
    polyamide 6/66 (F) having a moisture content of 0.1% or less,
    wherein a proportion of the inorganic filler (D) is 20% to 50% by mass with respect to the total mass (100% by mass) of the reinforced thermoplastic resin composition,
    a content of the glycidyl ether unit-containing polymer (E) is 3 to 8 parts by mass with respect to 100 parts by mass of the resin main component (C), and
    a content of the polyamide 6/66 (F) is 5 to 10 parts by mass with respect to 100 parts by mass of the resin main component (C).

2. The reinforced thermoplastic resin composition according to claim 1,
    wherein the polyamide 6/66 (F) has a relative viscosity of 1.5 to 4.5.

3. The reinforced thermoplastic resin composition according to claim 1,
    wherein the inorganic filler (D) is a carbon fiber.

4. The reinforced thermoplastic resin composition according to claim 1,
    wherein the inorganic filler (D) is a glass fiber.

5. The reinforced thermoplastic resin composition according to claim 1, further comprising:
    a phosphate ester-based flame retardant (G).

6. The reinforced thermoplastic resin composition according to claim 5,
    wherein a mass-average molecular mass of the phosphate ester-based flame retardant (G) exceeds 326.

7. A molded article that is obtained by molding the reinforced thermoplastic resin composition according to claim 1.

* * * * *